(12) United States Patent
Li et al.

(10) Patent No.: US 10,169,250 B2
(45) Date of Patent: Jan. 1, 2019

(54) METHOD AND APPARATUS METHOD AND APPARATUS FOR CONTROLLING ACCESS TO A HASH-BASED DISK

(71) Applicant: Tencent Technology (Shenzhen) Company Limited, Shenzhen, Guangdong (CN)

(72) Inventors: Yaqing Li, Shenzhen (CN); Jianping Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 636 days.

(21) Appl. No.: 14/734,798

(22) Filed: Jun. 9, 2015

(65) Prior Publication Data
US 2015/0278117 A1 Oct. 1, 2015

Related U.S. Application Data

(63) Continuation of application No. PCT/CN2014/070572, filed on Jan. 14, 2014.

(30) Foreign Application Priority Data

Jan. 15, 2013 (CN) .......................... 2013 1 0014430

(51) Int. Cl.
G06F 17/30 (2006.01)
G06F 12/14 (2006.01)
G06F 3/06 (2006.01)

(52) U.S. Cl.
CPC ............ G06F 12/14 (2013.01); G06F 3/0616 (2013.01); G06F 3/0659 (2013.01);
(Continued)

(58) Field of Classification Search
CPC ............ G06F 17/30867; G06F 3/0619; G06F 17/30321; G06F 17/3033; G06F 3/0608
See application file for complete search history.

(56) References Cited

U.S. PATENT DOCUMENTS 5,813,000 A * 9/1998 Furlani ............ G06F 17/30961
9,377,959 B2 * 6/2016 Chen ..................... G06F 3/0613
(Continued)

FOREIGN PATENT DOCUMENTS

| CN | 102609446 A | 7/2012 |
| CN | 102663090 A | 9/2012 |
| CN | 102782643 A | 11/2012 |

OTHER PUBLICATIONS

The World Intellectual Property Organization (WIPO) International Search Report for PCT/CN2014/070572 dated Apr. 23, 2014 pp. 1-3.

(Continued)

Primary Examiner — Angelica Ruiz
(74) Attorney, Agent, or Firm — Anova Law Group, PLLC

(57) ABSTRACT

A method and apparatus for controlling access to a hash-based disk is provided, the disk comprising a storage object, the storage object comprising a set of records and a hash value, the method comprising constructing a Bloom filter for the storage object; reading the set of records in the storage object; and filtering an access request to the storage object using the Bloom filter. In accordance with embodiments of the present invention, access requests to storage objects on the disk are filtered by a Bloom filter to reduce unnecessary accesses to the disk, and input and output accesses to the disk are reduced.

16 Claims, 3 Drawing Sheets

(52) U.S. Cl.
CPC ........ *G06F 3/0676* (2013.01); *G06F 17/3033* (2013.01); *G06F 2212/1052* (2013.01)

(56) References Cited

U.S. PATENT DOCUMENTS

| | | | |
|---|---|---|---|
| 2007/0239943 A1* | 10/2007 | Dice | G06F 9/466 |
| | | | 711/147 |
| 2008/0243800 A1* | 10/2008 | Beyer | G06F 12/0864 |
| 2011/0276744 A1 | 11/2011 | Sengupta et al. | |
| 2012/0102003 A1 | 4/2012 | Bhattacherjee et al. | |
| 2012/0314709 A1* | 12/2012 | Post | G06F 12/0802 |
| | | | 370/392 |
| 2013/0159449 A1* | 6/2013 | Taylor | G06F 15/167 |
| | | | 709/212 |

OTHER PUBLICATIONS

The State Intellectual Property Office of the People's Republic of China (SIPO) Office Action 1 for 201310014430.4 dated Jul. 31, 2017 pp. 1-11.

* cited by examiner

METHOD AND APPARATUS METHOD AND APPARATUS FOR CONTROLLING ACCESS TO A HASH-BASED DISK

CROSS-REFERENCE TO RELATED APPLICATIONS

This application is a continuation of International Patent Application No. PCT/CN2014/070572, entitled "Method and Apparatus for Controlling Access to a Hash-Based Disk," filed on Jan. 14, 2014. This application claims the benefit and priority of Chinese Patent Application No. 20130014430.4, entitled "Method and Apparatus for Controlling Access to a Hash-Based Disk," filed on Jan. 15, 2013. The entire disclosures of each of the above applications are incorporated herein by reference.

TECHNICAL FIELD

The present invention relates to computer technologies, and more particularly to a method and apparatus for controlling access to a hash-based disk.

BACKGROUND

Distributed storage systems can store vast amount of data, often in the scale of terabyte, or even petabyte. If the average size of a record is small, such as dozen of bytes, then the number of records is going to be huge. There are two approaches in designing a disk storage engine. In the first approach, no indexes for the records are created in the memory, the disk is organized solely based on hash, and multiple records are stored together. In the second approach, indexes for all the records are created in the memory, and the number of records equals to number of record keys. In the second approach, due to the large number of keys, it is often necessary to store a number of small records together using one hash, and maintain only one index for these records. Thus, storing a number of records together under one hash is quite common in hash-based disk storage systems.

In such a hash-based disk storage system, there are no indexes in the memory for a set of records {K1, K2, K3 . . . Kn}. In determining whether a particular record is in the set, all records in need to be accessed through Input/Output (I/O) resources. In certain circumstances, the requested record is not in the set, which results in unnecessary access and the wasting of I/O resources.

SUMMARY OF THE INVENTION

To address issues in the prior art, embodiments of the present invention provide a method and apparatus for controlling access to a hash-based disk, which can reduces unnecessary accesses to the disk.

In accordance with embodiments of the present invention, a method for controlling access to a hash-based disk is provided, the disk comprising a storage object, the storage object comprising a set of records and a hash value, the method comprising constructing a Bloom filter for the storage object; reading the set of records in the storage object; and filtering an access request to the storage object using the Bloom filter.

In accordance with embodiments of the present invention, an apparatus for controlling access to a hash-based disk is provided, the disk comprising a storage object, the storage object comprising a set of records and a hash value, the apparatus comprising a construction module for constructing a Bloom filter for the storage object; an initiation module for reading the set of records in the storage object; and an access control module for filtering an access request to the storage object using the Bloom.

In accordance with embodiments of the present invention, access requests to storage objects on the disk are filtered by a Bloom filter to reduce unnecessary accesses to the disk, and input and output accesses to the disk are reduced.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

Figure 1:
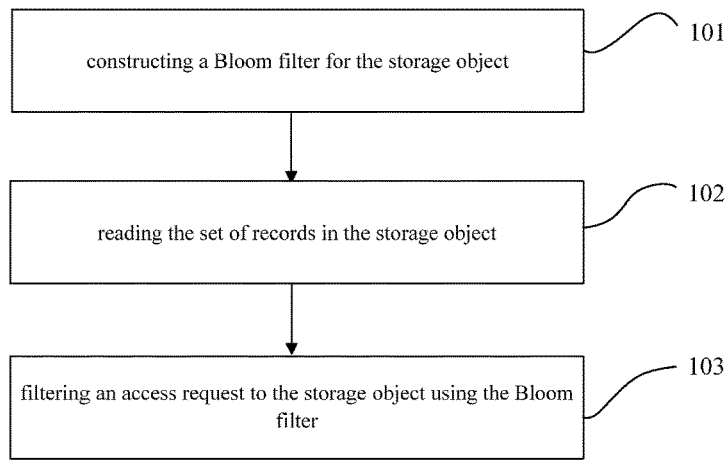
FIG. 1 is an exemplary flowchart for a method for controlling access to a hash-based disk in accordance with an embodiment of the present invention.

FIG. 1 is an exemplary flowchart for a method for controlling access to a hash-based disk in accordance with a first embodiment of the present invention. The disk includes a storage object having a hash value, and the storage object stores a set of records. As shown in FIG. 1, the method includes the following steps.

Step 101: constructing a Bloom filter for the storage object.

Step 102: reading the set of records in the storage object.

Step 103: filtering an access request to the storage object using the Bloom filter.

In this embodiment, the disk includes at least one storage object.

Figure 2:
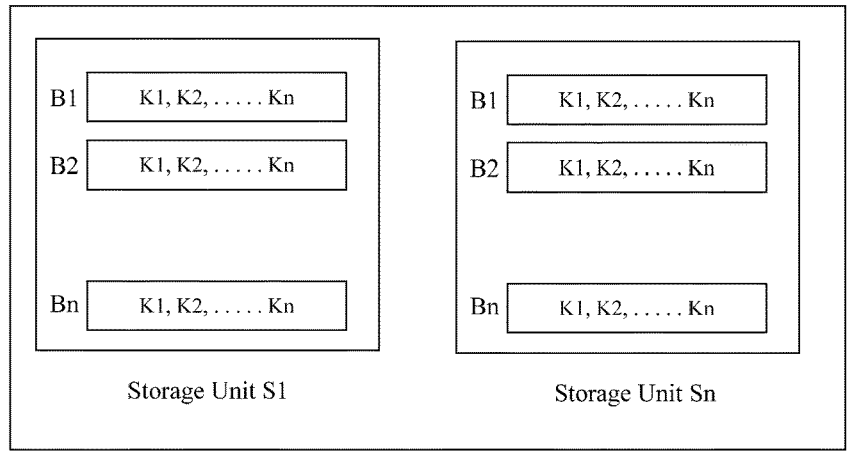
FIG. 2 is an exemplary schematic diagram for a hash-based disk in accordance with an embodiment of the present invention.

FIG. 2 is an exemplary schematic diagram for a hash-based disk in accordance with an embodiment of the present invention. The storage model for the data in the disk is defined as following: the disk is organized based on a hashing method, and divided into a number of fixed storage units; each storage unit can be considered as a hash table including a number of hash buckets. A number of records with the same hash value are stored together in a hash buckets. As shown in FIG. 2, $S_i$ represents a fixed-sized storage unit, Bi represents a hash bucket in the storage unit, and Ki represents a record in the hash bucket, wherein {K1, K2, K3 . . . Kn} ∈Bi, {B1, B2, B3 . . . Bn} ∈Si, i=1, 2, 3, . . . n. In accessing a record in a distributed storage system through a key, a storage unit is first located in the directory, a hash bucket is then identified by calculating the hash value of the key, and all records within the hash buckets are read to locate the requested record.

In this embodiment, the storage object can be viewed as a hash bucket.

Figure 3:
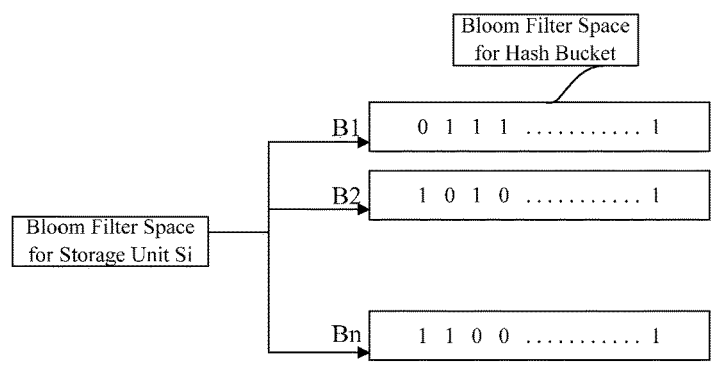
FIG. 3 is an exemplary schematic diagram for a Bloom filter in accordance with an embodiment of the present invention.

FIG. 3 is an exemplary schematic diagram for a Bloom filter in accordance with an embodiment of the present invention. A Bloom filter is a space-efficient probabilistic data structure, conceived by Burton Howard Bloom in 1970, that is used to test whether an element is a member of a set. False positive matches are possible, but false negatives are not; i.e. a query returns either "possibly in set" or "definitely not in set".

A Bloom filter generally is constructed as a bit array of M bits. There must also be K different hash functions defined, each of which maps or hashes some set element to one of the m array positions with a uniform random distribution.

To query for an element (test whether it is in the set), feed it to each of the K hash functions to get K array positions. If any of the bits at these positions are 0, the element is definitely not in the set—if it were, then all the bits would have been set to 1 when it was inserted. If all are 1, then either the element is in the set, or the bits have by chance been set to 1 during the insertion of other elements, resulting in a false positive.

In using a Bloom filter, several important parameters need to be carefully considered: (1) the number of hash function K, (2) the probability of false positives F, (3) the number of element in the set N, and (4) the size of the bit array M. These parameters have the following relationship: F=Function (M/N, K), which can be illustrated by Table 1 below.

TABLE 1

| M/N | K = 1 | K = 2 | K = 3 | K = 4 | K = 5 |
|---|---|---|---|---|---|
| 2 | 0.393 | 0.400 | | | |
| 3 | 0.283 | 0.237 | 0.253 | | |
| 4 | 0.221 | 0.155 | 0.147 | 0.160 | |
| 5 | 0.181 | 0.109 | 0.092 | 0.092 | 0.101 |
| 6 | 0.154 | 0.0804 | 0.0609 | 0.0561 | 0.0578 |

In a hash-based storage model, the keys for the records in the hash bucket are a limited set {K1, K2, K3 . . . Kn}, and the Bloom filter can be used to reduce unnecessary accesses. The Bloom filter is a probabilistic data structure, so that it will not prevent all unnecessary accesses. However, As shown in Table 1, for a particular hash bucket with N records, one can select the number of bits in the bit array (M) and the number of hush functions (K) so that the probability of false positives (unnecessary accesses) is within an acceptable range.

As shown in FIG. 3, the Bloom filter in this embodiment has an initiation bit and the Bloom filter bits. The initiation bit is one bit, initiated set as 0, to signify whether the storage object has been accessed.

In accordance with this embodiment of the present invention, access requests to the storage objects on the disk are filtered by a Bloom filter to reduce unnecessary accesses to the disk, and input and output accesses to the disk are reduced.

Figure 4:
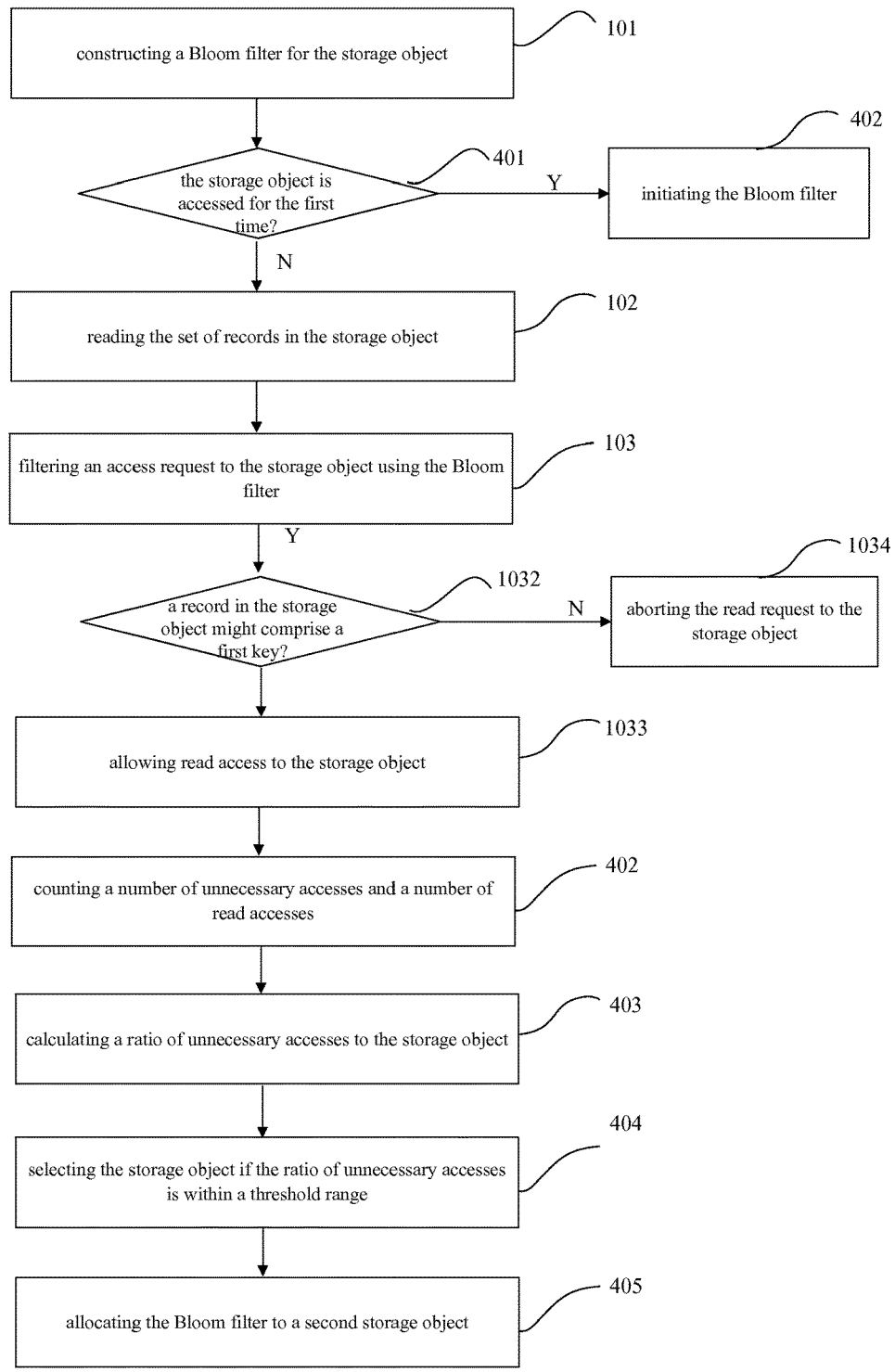
FIG. 4 is an exemplary flowchart for a method for controlling access to a hash-based disk in accordance with another embodiment of the present invention.

FIG. 4 is an exemplary flowchart for a method for controlling access to a hash-based disk in accordance with another embodiment of the present invention. As compared with the embodiment in FIG. 1, the method in FIG. 4 further includes Step 401 and 402 between Step 101 and 102.

Step 401: determining whether the storage object is accessed for the first time; if so, proceed to step 402, otherwise, proceed to step 102.

Step 402: initiating the Bloom filter when the storage object is accessed for the first time.

In step 402, the Bloom filter is initiated when the storage object on the disk is accessed for the first time.

In this embodiment, when the storage object (hash bucket) on the disk is accessed for the first time, all the records in the hash bucket will be read and used to initiate the Bloom filter, and the initiation bit of the Bloom filter will be set as 1.

The access request in this embodiment can be an output request, such as a read request or a query request.

As compared with the embodiment in FIG. 1, the method in this embodiment includes Steps 1032, 1033, and 1034 in lieu of Step 103.

Step 1032: filtering a read request to the storage object using the Bloom filter to determine whether a record in the storage object might comprise a first key; and if so, proceed to Step 1033; otherwise, proceed to Step 1034.

Step 1033: allowing read access to the storage object if it is determined that a record in the storage object might comprise the first key.

Step 1034: aborting the read request to the storage object if it is determined that no record in the storage object might comprise the first key. In another words, the read request to the storage object is filtered out by the Bloom filter.

In this embodiment, the Bloom filter is used to determine whether a record in the storage object might comprise the first key, and whether the access request to the storage object is an unnecessary access; read access is allowed if it is determined that a record in the storage object might comprise the first key, and read access is denied if it is determined that a record in the storage object might comprise the first key. Thus, unnecessary access to the storage object is reduced.

In a disk storage system with limited memory, Bloom filter resources are limited. Thus, more unnecessary accesses to the disk can be avoided if the limited Bloom filters are used on storage objects that are most likely to receive unnecessary access requests.

Here, the storage objects refer to the hash buckets in the storage unit; Bloom filter resources refer to the capacity to build Bloom filters and use the Bloom filters to filter access requests, or memory space for building the Bloom filters.

To better allocate Bloom filter resources, the method in this embodiment further includes the Steps 402, 403, 404, and 405.

Step 402: counting a number of unnecessary accesses and a number of read accesses, wherein the number of unnecessary accesses is the number of access requests filtered out by the Bloom filter, and the number of read access is the number of access requests to the storage object.

Step 403: calculating a ratio of unnecessary accesses to the storage object based on the number of unnecessary accesses and the number of read accesses. Specifically, the ratio can be calculated by dividing the number of unnecessary accesses by the number of read accesses.

Step 404: selecting the storage object if the ratio of unnecessary accesses is within a threshold range. Here, if the ratio of unnecessary accesses is within a threshold range, we can deem the storage object as having a low ratio of unnecessary access; otherwise, the storage object is deemed as having a high ratio of unnecessary access. For example, the threshold range can be defined as 0-90%, and the corresponding range outside the threshold range is 90% to 100%; the threshold range can also be defined as 0-60%, and the corresponding range outside the threshold range is 60% to 100%; and the threshold range can also be defined as 0-30%, and the corresponding range outside the threshold range is 30% to 100%.

Step 405: allocating the Bloom filter to a second storage object if the ratio of unnecessary accesses is within a threshold range.

Here, during the initiation stage, based on the size of the available memory, Bloom filter resources are only allocated to some storage objects, while other storage objects are put on a waiting list. These two sets of storage objects can be represented as {R11, R12, R13, . . . , Rij} ∈R, {W11, W12, W13, . . . , Wij} ∈W, wherein Rij and Wij each represents a storage object, R represents the set of storage objects being allocated with Bloom filter resources, and W represents the set of storage objects not being allocated with Bloom filter resources.

After the ratio of unnecessary access for all the storage objects in set R is calculated, the Bloom filter resources for the storage objects with low ratio of unnecessary access are released and allocated to the storage objects in set W.

By allocating Bloom filters to storage objects that are most likely to receive unnecessary access requests, this embodiment further reduces unnecessary access to the disk.

Optionally, the method further includes generating a timing signal prior to step 403, and periodically calculating the ratio of unnecessary accesses based on the timing signal in Step 403. Here, as the ratio of unnecessary accesses is calculated periodically based on the timing signal, the Bloom filters can be reallocated to other storage storages periodically. Thus, the Bloom filter resources are dynamically allocated to optimize performance of the disk, and further reduce unnecessary accesses to the disk.

Optionally, the method includes determining a write access to the storage object has completed, request, and if so, modifying the relevant bits in the Bloom filter. Here, after a record in the storage object has been updated, the bits in the Bloom filter relevant to this record is modified correspondingly to optimize performance of the disk, and further reduce unnecessary accesses to the disk.

Optionally, the method includes receiving an instruction to delete a record comprising a second key; deleting the record comprising the second key in accordance with the instruction; and initializing the Bloom filter after deleting the record comprising the second key. Here, after a record with the second key is deleted, the number of records in the storage object is reduced, and the Bloom filter is initiated using the remaining records in the storage object to optimize performance of the disk, and further reduce unnecessary accesses to the disk.

In accordance with this embodiment of the present invention, access requests to the storage objects on the disk are filtered by a Bloom filter to reduce unnecessary accesses to the disk, and input and output accesses to the disk are reduced.

Figure 5:
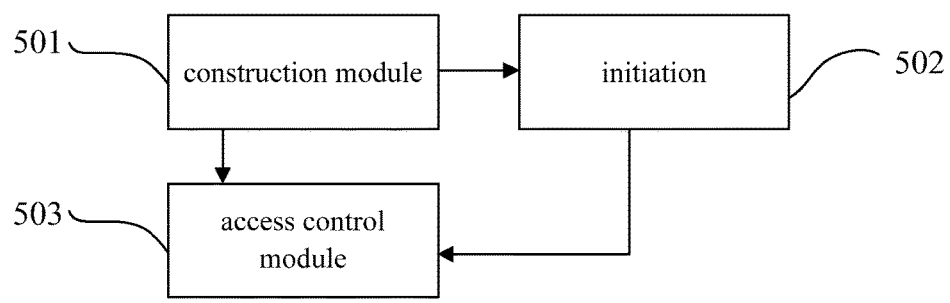
FIG. 5 is an exemplary schematic diagram for an apparatus for controlling access to a hash-based disk in accordance with an embodiment of the present invention.

FIG. 5 is an exemplary schematic diagram for an apparatus for controlling access to a hash-based disk in accordance with an embodiment of the present invention. As shown in FIG. 5, the apparatus includes a construction module 501, an initiation module 502, and an access control module 503.

The construction module 501 is used for constructing a Bloom filter for the storage object.

The initiation module 502 is used for reading the set of records in the storage object.

The access control module 503 is used for filtering an access request to the storage object using the Bloom filter.

In this embodiment, the disk includes at least one storage object.

The storage model for the data in the disk is defined as following: the disk is organized based on a hashing method, and divided into a number of fixed storage units; each storage unit can be considered as a hash table including a number of hash buckets. A number of records with the same hash value are stored together in a hash buckets. As shown in FIG. 2, $S_i$ represents a fixed-sized storage unit, Bi represents a hash bucket in the storage unit, and Ki represents a record in the hash bucket, wherein {K1, K2, K3 . . . Kn} ∈Bi, {B1, B2, B3 . . . Bn} ∈Si, i=1, 2, 3, . . . n. In accessing a record in a distributed storage system through a key, a storage unit is first located in the directory, a hash bucket is then identified by calculating the hash value of the key, and all records within the hash buckets are read to locate the requested record.

In this embodiment, the storage object can be viewed as a hash bucket.

As shown in FIG. 3, the Bloom filter in this embodiment has an initiation bit and the Bloom filter bits. The initiation bit is one bit, initiated set as 0, to signify whether the storage object has been accessed.

In accordance with this embodiment of the present invention, access requests to the storage objects on the disk are filtered by a Bloom filter to reduce unnecessary accesses to the disk, and input and output accesses to the disk are reduced.

Figure 6:
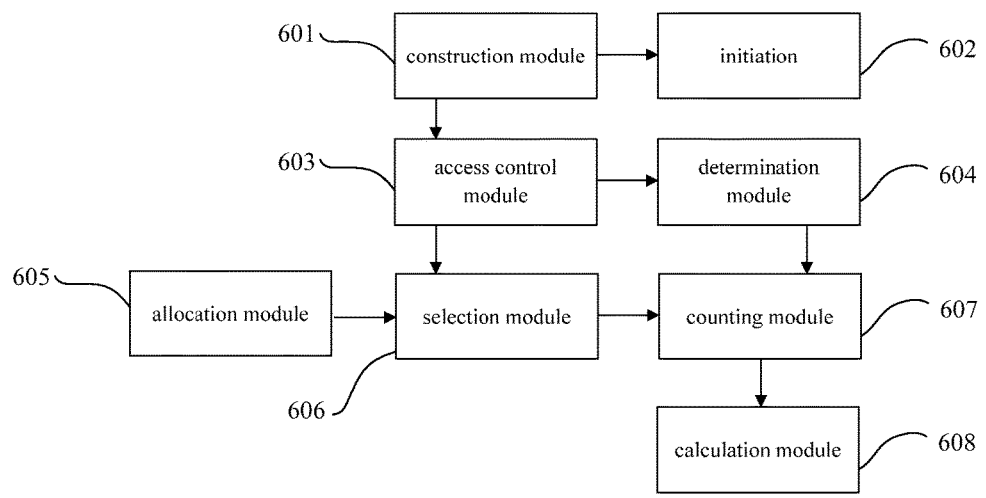
FIG. 6 is an exemplary schematic diagram for an apparatus for controlling access to a hash-based disk in accordance with another embodiment of the present invention.

FIG. 6 is an exemplary schematic diagram for an apparatus for controlling access to a hash-based disk in accordance with another embodiment of the present invention. As shown in FIG. 6, the apparatus includes a construction module 601, an initiation module 602, and an access control module 603.

The construction module 601 is used for constructing a Bloom filter for the storage object.

The initiation module 602 is used for reading the set of records in the storage object.

The access control module 603 is used for filtering an access request to the storage object using the Bloom filter.

As compared with the embodiment in FIG. 5, the initiation module 602 is also used for initiating the Bloom filter when the storage object is accessed for the first time.

In this embodiment, the Bloom filter is initiated when the storage object on the disk is accessed for the first time.

In this embodiment, when the storage object (hash bucket) on the disk is accessed for the first time, all the records in the hash bucket will be read and used to initiate the Bloom filter, and the initiation bit of the Bloom filter will be set as 1.

The access request in this embodiment can be an output request, such as a read request or a query request.

As compared with the embodiment in FIG. 1, the apparatus in this embodiment also includes a determination module 604.

The determination module 604 is used for filtering the read request to the storage object using the Bloom filter to determine whether a record in the storage object might comprise a first key.

The access control module 603 is also used for allowing read access to the storage object if it is determined that a record in the storage object might comprise the first key.

The access control module 603 is also used for aborting the read request to the storage object if it is determined that no record in the storage object might comprise the first key.

In another words, the read request to the storage object is filtered out by the Bloom filter.

In this embodiment, the Bloom filter is used to determine whether a record in the storage object might comprise the first key, and whether the access request to the storage object is an unnecessary access; read access is allowed if it is determined that a record in the storage object might comprise the first key, and read access is denied if it is determined that a record in the storage object might comprise the first key. Thus, unnecessary access to the storage object is reduced.

In a disk storage system with limited memory, Bloom filter resources are limited. Thus, more unnecessary accesses to the disk can be avoided if the limited Bloom filters are used on storage objects that are most likely to receive unnecessary access requests.

Here, the storage objects refer to the hash buckets in the storage unit; Bloom filter resources refer to the capacity to build Bloom filters and use the Bloom filters to filter access requests, or memory space for building the Bloom filters.

To better allocate Bloom filter resources, the apparatus in this embodiment further includes a selection module 606, a counting module 607, a calculation module 608 an allocation module 605.

The counting module 607 is used for counting a number of unnecessary accesses and a number of read accesses, wherein the number of unnecessary accesses is the number of access requests filtered out by the Bloom filter, and the number of read access is the number of access requests to the storage object.

The calculation module 608 is used for calculating a ratio of unnecessary accesses to the storage object based on the number of unnecessary accesses and the number of read access.

The selection module 606 is used for selecting the storage object if the ratio of unnecessary accesses is within a threshold range. Here, if the ratio of unnecessary accesses is within a threshold range, we can deem the storage object as having a low ratio of unnecessary access; otherwise, the storage object is deemed as having a high ratio of unnecessary access. For example, the threshold range can be defined as 0-90%, and the corresponding range outside the threshold range is 90% to 100%; the threshold range can also be defined as 0-60%, and the corresponding range outside the threshold range is 60% to 100%; and the threshold range can also be defined as 0-30%, and the corresponding range outside the threshold range is 30% to 100%.

The allocation module 605 is used for allocating assigning the Bloom filter to a second storage object when the ratio of unnecessary accesses is within a threshold range.

If the ratio of unnecessary accesses is within a threshold range, we can deem the storage object as having a low ratio of unnecessary access; otherwise, the storage object is deemed as having a high ratio of unnecessary access. For example, the threshold range can be defined as 0-90%, 0-60%, or 0-30%. If the storage object is deemed as having a low ratio of unnecessary access, allocate the Bloom filter to a second storage object.

Here, during the initiation stage, based on the size of the available memory, Bloom filter resources are only allocated to some storage objects, while other storage objects are put on a waiting list. These two sets of storage objects can be represented as {R11, R12, R13, . . . , Rij} ∈R, {W11, W12, W13, . . . , Wij} ∈W, wherein Rij and Wij each represents a storage object, R represents the set of storage objects being allocated with Bloom filter resources, and W represents the set of storage objects not being allocated with Bloom filter resources.

After the ratio of unnecessary access for all the storage objects in set R is calculated, the Bloom filter resources for the storage objects with low ratio of unnecessary access are released and allocated to the storage objects in set W.

By allocating Bloom filters to storage objects that are most likely to receive unnecessary access requests, this embodiment further reduces unnecessary access to the disk.

Optionally, the apparatus includes timing signal generation module. The timing signal generation module is used for generating a timing signal.

The calculating module 608 is used for periodically calculating the ratio of unnecessary accesses based on the timing signal.

Here, as the ratio of unnecessary accesses is calculated periodically based on the timing signal, the allocation module 605 allocates the Bloom filters to other storage storages periodically. Thus, the Bloom filter resources are dynamically allocated to optimize performance of the disk, and further reduce unnecessary accesses to the disk.

Optionally, the access control module is configured for modifying a bit in the Bloom filter after a write request to the storage object.

Here, after a record in the storage object has been updated, the bits in the Bloom filter relevant to this record is modified correspondingly to optimize performance of the disk, and further reduce unnecessary accesses to the disk.

Optionally, the apparatus includes an instruction acquisition module for receiving an instruction to delete a record comprising a second key; and a deletion module for deleting a record comprising a second key; wherein the initiation module is configured for initializing the Bloom filter after deleting the record comprising the second key.

Here, after a record with the second key is deleted, the number of records in the storage object is reduced, and the Bloom filter is initiated using the remaining records in the storage object to optimize performance of the disk, and further reduce unnecessary accesses to the disk.

In accordance with this embodiment of the present invention, access requests to the storage objects on the disk are filtered by a Bloom filter to reduce unnecessary accesses to the disk, and input and output accesses to the disk are reduced.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for controlling access to a hash-based disk, the disk comprising a storage object, the storage object comprising a set of records and a hash value, the method comprising:
   constructing a Bloom filter for the storage object, the Bloom filter comprising an initial bit and a plurality of Bloom filter bits;
   determining whether the storage object is accessed for a first time, wherein when the initial bit is a predefined value, the storage object is determined being accessed for the first time;
   when the storage object is determined as not being accessed for the first time, reading the set of records in the storage object;
   filtering an access request to the storage object using the Bloom filter;

counting a number of unnecessary accesses and a number of read accesses, wherein the number of unnecessary accesses is a number of access requests filtered out by the Bloom filter, and the number of read accesses is a number of access requests to the storage object;

calculating a ratio of unnecessary accesses to the storage object based on the number of unnecessary accesses and the number of read accesses, wherein the ratio of unnecessary accesses is calculated by dividing the number of unnecessary accesses by the number of read accesses; and when the ratio of unnecessary accesses is within a threshold range, selecting the storage object and allocating the Bloom filter to a second storage object.

2. The method of claim 1, further comprising:
when the storage object is determined as being accessed for the first time, initiating the Bloom filter when the storage object is accessed for the first time.

3. The method of claim 1, wherein the access request is a read request, and the method further comprises:
filtering the read request to the storage object using the Bloom filter to determine whether a record in the storage object might comprise a first key; and
allowing read access to the storage object if it is determined that a record in the storage object might comprise the first key.

4. The method of claim 1, wherein the Bloom filter comprises M bits, K hash functions are defined for the Bloom filter, the storage object comprises N records, and the step of constructing a Bloom filter for the storage object further comprising:
constructing the Bloom filter so that a probability of false positives for the Bloom filter is lower than a threshold value.

5. The method of claim 1, further comprising:
generating a timing signal;
periodically calculating the ratio of unnecessary accesses based on the timing signal.

6. The method of claim 5, wherein the access request is a write request, and the method further comprises:
modifying a bit in the Bloom filter after a write request to the storage object.

7. The method of claim 5, further comprising
receiving an instruction to delete a record comprising a second key;
deleting the record comprising the second key in accordance with the instruction; and
initializing the Bloom filter after deleting the record comprising the second key.

8. An apparatus for controlling access to a hash-based disk, the disk comprising a storage object, the storage object comprising a set of records and a hash value, the apparatus comprising:
a memory; and
a processor coupled to the memory, wherein the processor is configured to:
construct a Bloom filter for the storage object, the Bloom filter comprising an initial bit and a plurality of Bloom filter bits;
determine whether the storage object is accessed for a first time, wherein when the initial bit is a predefined value, the storage object is determined being accessed for a first time;

when the storage object is determined as not being accessed for the first time, read the set of records in the storage object;

filter an access request to the storage object using the Bloom filter;

count a number of unnecessary accesses and a number of read accesses, wherein the number of unnecessary accesses is a number of access requests filtered out by the Bloom filter, and the number of read accesses is a number of access requests to the storage object;

calculate a ratio of unnecessary accesses to the storage object based on the number of unnecessary accesses and the number of read accesses, wherein the ratio of unnecessary accesses is calculated by dividing the number of unnecessary accesses by the number of read accesses; and when the ratio of unnecessary accesses is within a threshold range, select the storage object and allocate the Bloom filter to a second storage object.

9. The apparatus of claim 8, wherein the processor is configured to:
when the storage object is determined as being accessed for the first time, initiate the Bloom filter when the storage object is accessed for the first time.

10. The apparatus of claim 8, wherein the access request is a read request, the processor is further configured to:
filter the read request to the storage object using the Bloom filter to determine whether a record in the storage object might comprise a first key; and
allow read access to the storage object if it is determined that a record in the storage object might comprise the first key.

11. The apparatus of claim 8, wherein the Bloom filter comprises M bits, K hash functions are defined for the Bloom filter, the storage object comprises N records, and a probability of false positives for the Bloom filter is lower than a threshold value.

12. The apparatus of claim 8, the processor is further configured to:
generate a timing signal; and
periodically calculate the ratio of unnecessary accesses based on the timing signal.

13. The apparatus of claim 12, wherein the access request is a write request, and the processor is configured to modify a bit in the Bloom filter after a write request to the storage object.

14. The apparatus of claim 12, the processor is further configured to:
receive an instruction to delete a record comprising a second key; and
delete a record comprising a second key; and
initialize the Bloom filter after deleting the record comprising the second key.

15. The method of claim 1, wherein the initial bit is one bit and the initial bit is initially set as 0 to represent the storage object being accessed for the first time.

16. The apparatus of claim 8, wherein the initial bit is one bit and the initial bit is initially set as 0 to represent the storage object being accessed for the first time.

* * * * *